United States Patent

Bowker

[11] Patent Number: 5,922,075
[45] Date of Patent: Jul. 13, 1999

[54] POWER MANAGEMENT CONTROL OF POINTING DEVICES DURING LOW-POWER STATES

[75] Inventor: John W. Bowker, Hillsboro, Oreg.

[73] Assignee: Intel Corporation, Santa Clara, Calif.

[21] Appl. No.: 08/772,163

[22] Filed: Dec. 20, 1996

Related U.S. Application Data

[51] Int. Cl.⁶ .................................................. G06F 1/32
[52] U.S. Cl. ........................... 713/300; 713/320; 713/322; 713/323; 713/324; 713/340
[58] Field of Search .................. 395/750.01–750.08; 365/227, 229; 713/300, 310, 320, 322, 323, 324, 330, 340, 400, 600, 601; 709/300, 301; 710/58, 61

[56] References Cited

U.S. PATENT DOCUMENTS

| | | | |
|---|---|---|---|
| 5,511,204 | 4/1996 | Crump et al. | 395/750.07 |
| 5,590,341 | 12/1996 | Matter | 395/750.03 |
| 5,630,144 | 5/1997 | Woog et al. | 395/750.02 |
| 5,790,875 | 8/1998 | Andersin et al. | 395/750.03 |

*Primary Examiner*—Ayaz R. Sheikh
*Assistant Examiner*—Ario Etienne
*Attorney, Agent, or Firm*—Kenyon & Kenyon

[57] ABSTRACT

In a computer system having a processor capable of selectively operating in a first and second mode and a user input device managed by a controller, a method for maintaining synchronization between a user input device and an associated device driver includes initiating a transition of the processor from the first mode to the second mode upon occurrence of a predetermined event; detecting a user interaction with the user input device; initiating a transition of the processor back to the first mode; instructing a controller coupled to the user input device to process the user interaction and issue a signal to the processor upon completion; and initiating a transition of the processor back to the second mode upon receipt of the signal from the controller.

14 Claims, 1 Drawing Sheet

POWER MANAGEMENT CONTROL OF POINTING DEVICES DURING LOW-POWER STATES

BACKGROUND OF THE INVENTION

The present invention relates generally to the field of power management in computer systems, and in particular to a method and apparatus for ensuring that a pointing device and its associated driver maintain synchronization when the computer system is in a low-power state.

With the increasing popularity of mobile computers, as evidenced by the growth in the market for so-called "notebook" or "laptop" computers, power consumption has become an important consideration for computer designers. Power conservation efforts have been directed at virtually every aspect of such computers, including hardware, firmware and software. For example, most of today's popular processors, such as Intel's Pentium® family of processors, are capable of operating in a low-power mode. In addition, many computers now include power management functionality as part of an installed BIOS (Basic Input-Output System). Software designers are also becoming more power-conscious, writing "green" applications which are themselves power efficient while cooperating with the aforementioned hardware and firmware facilities.

One of the problems faced by computer designers, firmware developers and software developers with respect to power management is how to deal with users. Users present an unpredictable source of potential interference with power management efforts through intentional and unintentional interactions with the computer system, creating conflicts between normal processing and power management processing. For example, a user may be unconsciously moving a pointing device, such as a mouse, a track ball, or a light pen, for no processing-related reason, but such a movement may have the unintended effect of postponing power conservation in many power management schemes.

Another problem may occur when the user initiates power management processing by, for example, pressing the "suspend/resume" button or closing the lid, while the computer is in the middle of processing information from a pointing device. This can result in the pointing device losing synchronization with its associated foreground operating system (OS) device driver, causing the OS device driver to misinterpret or ignore movements of the pointing device when the computer "wakes up" from a suspended condition. A common symptom of such a problem is a lack of correspondence between movements of a mouse and the on-screen cursor.

There is presently no satisfactory solution to the problem of interference with power management in computer systems caused by user interactions with input devices.

SUMMARY OF THE INVENTION

The present invention relates to the control of user input devices in a computer system having a processor capable of selectively operating in at least first and second modes of operation. According to an embodiment of the invention, directed to a computer system having a processor capable of selectively operating in a first and second mode and a user input device managed by a controller, a method for maintaining synchronization between a user input device and an associated device driver includes initiating a transition of the processor from the first mode to the second mode upon occurrence of a predetermined event; detecting a user interaction with the user input device; initiating a transition of the processor back to the first mode; instructing a controller coupled to the user input device to process the user interaction and issue a signal to the processor upon completion; and initiating a transition of the processor back to the second mode upon receipt of the signal from the controller.

DETAILED DESCRIPTION

Figure 1:
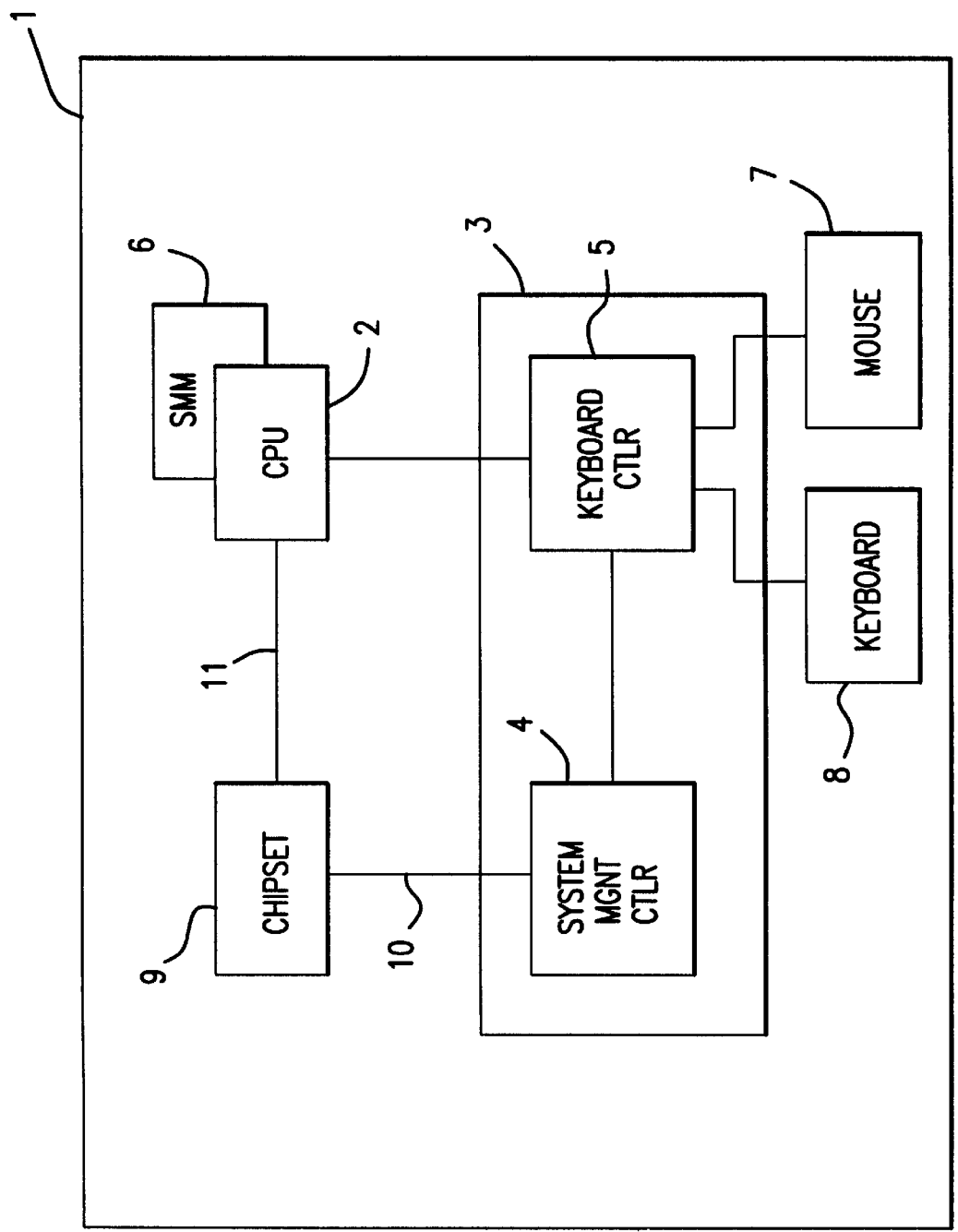
FIG. 1 is a block diagram illustrating an embodiment of the present invention.

Many modern computer systems, including most battery-powered mobile computers, employ a central processing unit (CPU) capable of selectively operating in either a "normal mode" or a system management mode (SMM mode). In a typical arrangement, occurrence of a predetermined power management event causes the CPU to transition from normal mode to SMM mode for implementing a low-power state of operations. With respect to a typical mobile computer, for example, such an event may be the user pressing a suspend/resume button or closing the lid of the computer.

While in SMM mode, the CPU no longer executes the system's operating system code. Rather, the CPU executes an SMM handler comprising code resident in BIOS firmware. The SMM handler is responsible for managing the system's low-power state by, for example, performing any necessary initialization processing and reactivating the system upon occurrence of some "wake up" event (such as the user again pressing the suspend/resume button or raising the lid of the computer. To reactivate the system, the SMM handler causes the CPU to return to its normal mode, and the CPU resumes executing the operating system code.

FIG. 1 illustrates an exemplary computer system 1 in which an embodiment of the present invention is implemented. Computer system 1 may be virtually any computer system or similar data processing device, including a mobile computer, a desktop PC, and a dedicated network server computer. In the present embodiment, computer system 1 may be configured according to a PS/2 architecture. An example of such a computer is the Compaq LTE 5000; however, this and other embodiments are readily applicable to other types of power-managed computers and data processing devices.

Computer system 1 includes a CPU 2 coupled to a microcontroller 3. In this embodiment, CPU 2 is capable of selectively operating in a normal mode and an SMM mode. During normal mode operations, CPU 2 executes an operating system (not shown) which controls the operations of computer system 1; during SMM mode, CPU 2 does not execute the operating system code, but instead executes an SMM handler 6 comprising code resident in a BIOS (not shown).

In this particular embodiment, microcontroller 3 includes a system management controller 4 and a keyboard controller 5. System management controller 4 and keyboard controller 5 may be implemented, for example, as firmware in separate Hitachi H8 microcontrollers electronically coupled to one another. Alternatively, these components may be implemented in a single Hitachi H8 microcontroller. A chipset 9 is coupled between system management controller 4 and CPU 2. Keyboard controller 5 is capable of asserting a signal to chipset 9 (through system management controller 4) over a dedicated coupling 10.

Keyboard controller 5 may be coupled to a plurality of user input devices, such as PS/2 pointing devices. In this embodiment, for example, keyboard controller 5 is coupled to a keyboard 8 and a mouse 7. Other examples of such user input devices include a light pen and a track ball. When a user of computer system 1 moves mouse 7, keyboard controller 5 translates each unit of physical movement into a three-byte data packet which it sends one byte at a time to CPU 2 for processing by an appropriate OS device driver (not shown). Keyboard controller 5 typically sends a stream of such data packets to CPU 2 representative of a segment of continuous movement of mouse 7.

In this embodiment, where keyboard controller 5 is coupled to a PS/2 pointing device, keyboard controller 5 and an associated OS device driver may attempt to maintain synchronization by respectively decrementing/incrementing counters associated with the transmission/receipt of a given data packet. For example, keyboard controller 5 may initialize a transmission counter to "3" and the OS device driver may initialize a corresponding counter to "0". Upon sending the first byte of a three-byte data packet, keyboard controller 5 decrements its counter to "2"; upon receiving that first byte, the OS device driver increments its counter to 1. Under normal conditions, this continues until keyboard controller 5 has sent all three bytes, at which time its counter is at "0", and the OS device driver has received all three bytes, at which time its counter is at "3".

According to the present embodiment, CPU 2 may be configured to cause both computer system 1 and itself to enter a low-power state upon occurrence of some predetermined power management event. Such an event will result in generation of a system management interrupt (SMI) to CPU 2. Detection of an SMI causes CPU 2 to transition from normal mode to SMM mode, suspending execution of the operating system and initiating execution of SMM handler 6. At this point, SMM handler 6 (executed by CPU 2) controls the operations of computer system 1.

In some cases, a power management event may cause CPU 2 to initiate low-power processing in the midst of a transmission sequence between keyboard controller 5 and CPU 2. When CPU 2 is subsequently reactivated, keyboard controller 5 will typically be reinitialized, including a reset of the above-referenced transmission counter. The OS device driver, on the other hand, will typically not be reinitialized, meaning its transmission counter will still be set to the value it held at the time it was suspended. When the user moves mouse 7 again, keyboard controller 5 may begin transmission of a new three-byte data packet, but the OS device driver may interpret the transmission as a continuation of the earlier transmission, thus putting mouse 7 and its associated OS device driver out of synch.

According to the present embodiment, SMM handler 6 may include instructions for ensuring that mouse 7 and its associated OS device driver remain synchronized while CPU 2 is in its low-power state. While SMM handler 6 is implementing the low-power state, it preferably polls an output port (not shown) of keyboard controller 5 for data. The existence of a byte on the output port indicates the user has moved mouse 7 during low-power processing. To avoid a loss of synchronization, SMM handler 6 may send a command to microcontroller 3 while passing control back to the operating system. In this particular embodiment, the command may instruct keyboard controller 5 to disable mouse 7, thereby ensuring the user cannot generate data packets indefinitely by continuing to move mouse 7. Keyboard controller 5 may also disable any other user input devices coupled to it, including keyboard 8, to close off other possible sources of interfering user input. In addition, the command may instruct keyboard controller 5 to issue an external SMI once it completes sending the current data packet to the OS device driver to notify CPU 2 that it may resume low-power processing. In this embodiment, keyboard controller 5 (through system management controller 4) issues this external SMI as a signal to chipset 9 over dedicated coupling 10. Chipset 9 may in turn generate an SMI to CPU 2 via an SMI# signal line 11.

Assertion of the SMI at CPU 2 causes CPU 2 to again switch from normal mode to SMM mode, once again suspending execution of the operating system and initiating execution of SMM handler 6. Once SMM handler 6 begins execution, it may attempt to determine the cause of the triggering SMI. Although SMM handler 6 had not been executing since completion of the previous SMI (presumably the one that initially triggered the low-power state), SMM handler 6 may nevertheless be configured to retain a record of its activity from SMI to SMI. This may be accomplished in any number of ways known in the art. For example, a "flag" may be set within SMM handler 6 signifying that SMM handler 6 was trying to implement a low-power condition during processing of the last SMI. Then, upon being initiated and detecting that the flag is set, SMM handler 6 may interpret the most-recent SMI as a signal to complete the interrupted processing and automatically resume where it left off. Alternatively, SMM handler 6 may be configured to actively determine the cause of the most-recent SMI before resuming low-power processing, since it is conceivable that some event more critical than a power management event generated the SMI. This type of active determination may be facilitated, for example, by including an indication of the reason for the SMI in the signal generated by chipset 9 to CPU 2. Other methods of determining the reason for a generated SMI are also possible, and fall within the scope of the present invention.

Regardless of the technique used, upon determining that the most-recent SMI is signaling the resumption of low-power processing, SMM handler 6 may resume implementing the low-power state with assurance that no additional data packets will be transmitted by keyboard controller 5 because mouse 7 is now in a known disabled state. In addition to ensuring synchronization of mouse 7 and its OS device driver, disabling the user input devices ensures that a user cannot inadvertently thwart power management by, for example, continuing to move mouse 7 for no processing-related purpose.

Embodiments of the present invention can facilitate power management in computer systems and other data processing devices by ensuring user input devices remain synchronized with their associated OS device drivers during power management. Avoiding such synchronization problems promotes increased user-perceived quality and reliability of power-managed computer systems. Moreover, in contrast to known power management techniques, embodiments of the present invention disable pointing devices during low-power processing to ensure a user does not inadvertently interfere with the power management functions, providing an added benefit of extended battery life.

The foregoing is a detailed description of particular embodiments of the present invention as defined in the claims set forth below. The invention embraces all alternatives, modifications and variations that fall within the letter and spirit of the claims, as well as all equivalents of the claimed subject matter. For example, in another embodiment of the present invention, rather than issuing an SMI to instruct a CPU to resume previously-interrupted low-power processing, a keyboard controller (or an equivalent controller) may set a status bit which is polled by an SMM handler executing periodically. Upon detecting that such a status bit is set, the SMM handler may resume low-power processing in the same manner described above. Persons skilled in the art will recognize that many other alternatives, modifications and variations are also possible.

What is claimed is:

1. A method for maintaining synchronization between a user input device and an associated device driver in a computer system, the computer system including a processor capable of selectively operating in a first and second mode, the user input device being managed by a controller, said method comprising the steps of:

initiating a transition of the processor from the first mode to the second mode upon occurrence of a predetermined event;

detecting a user interaction with the user input device;

initiating a transition of the processor back to the first mode;

instructing the controller to process the user interaction, disable the user input device, and issue a signal to the processor upon completion; and initiating a transition of the processor back to the second mode upon receipt of the signal from the controller.

2. The method of claim 1, wherein the signal issued by the controller comprises a system management interrupt.

3. The method of claim 1, wherein said step of detecting a user interaction with the user input device comprises detecting a pending transfer of data from the controller to the processor representative of the user interaction.

4. The method of claim 1, wherein the first mode comprises a normal mode and the second mode comprises a low-power mode, said predetermined event comprising a power management event.

5. A set of instructions residing on a storage medium for maintaining synchronization between a user input device and an associated device driver in a computer system, the computer system including a processor capable of operating in a normal mode and a low-power mode, said set of instructions comprising instructions for:

initiating the low-power mode upon detection of a power-management event;

terminating the low-power mode upon detection of a pending data transfer from the user input device to the associated device driver;

disabling the user input device upon completion of the pending data transfer; and resuming the low-power mode upon completion of the pending data transfer.

6. The set of instructions of claim 5, wherein said medium comprises firmware installed in the computer system.

7. An apparatus for synchronizing a user input device and a device driver in a power-managed computer, the power-managed computer including a processor capable of selectively operating in a normal mode and a low-power mode, a controller coupled to the processor, and a user input device coupled to the controller, said apparatus comprising firmware executable by the processor and including program code for:

detecting a pending data transfer from the controller to the processor resulting from a manipulation of the user input device while the processor is in the low-power mode;

transitioning the processor from the low-power mode to the normal mode;

instructing the controller to disable the user input device upon completion of the pending data transfer and issue a signal indicating said completion, said signal causing the processor to transition from the normal mode to the low-power mode.

8. The apparatus of claim 7, wherein the power-managed computer system further includes a chipset coupled between the controller and the processor, said signal issued by the controller comprising an interrupt issued by the controller to the chipset causing the chipset to issue a responsive interrupt to the processor.

9. The apparatus of claim 8, wherein the responsive interrupt issued by the chipset includes an indication of an event causing issuance of the responsive interrupt.

10. The apparatus of claim 7, wherein the power-managed computer system further includes a system management mode handler executed by the processor while in the low-power mode, said signal issued by the controller comprising a signal setting a flag accessible by the system management mode handler.

11. A power-managed computer system comprising:

a processor capable of selectively operating in a normal mode and a low-power mode, said low-power mode being triggered by a predetermined power management event;

an operating system capable of controlling operations of said power-managed computer system, said operating system being executed by said processor when said processor is in said normal mode;

a user input device enabling a user to communicate commands to said power-managed computer system through said operating system;

a controller coupled to said user input device, said controller being configured to translate a physical manipulation of said user input device into a digital representation of said physical manipulation, and to send said digital representation to said processor through said operating system; and a system management mode handler capable of controlling operations of said power-managed computer system, said system management mode handler being executed by said processor while said processor is in said low-power mode, said system management mode handler being configured to issue a command to said controller upon detection of a pending communication from said controller to said operating system, said command instructing said controller to complete said pending communication and disable said user input device.

12. The power-managed computer system of claim 11, wherein said system management mode handler is further configured to terminate low-power mode processing while said controller completes said pending data transfer and resume low-power mode processing upon said completion.

13. An apparatus for synchronizing a user input device and a device driver in a power-managed computer, the power-managed computer including a processor capable of selectively operating in a normal mode and a low-power mode, a controller coupled to a user input device, and a chipset coupled between the processor and the controller, said apparatus comprising firmware executable by the processor and including program code for:

detecting a pending data transfer from the controller to the processor resulting from a manipulation of the user input device while the processor is in the low-power mode;

transitioning the processor from the low-power mode to the normal mode;

instructing the controller to disable the user input device upon completion of the pending data transfer and issue an interrupt to the chipset indicating said completion, said signal causing the chipset to issue a responsive interrupt to the processor, and said responsive interrupt causing the processor to transition from the normal mode to the low-power mode.

14. The apparatus of claim 13, wherein the responsive interrupt issued by the chipset includes an indication of an event causing issuance of the responsive interrupt.

* * * * *